(No Model.)
E. SCHAAL.
MANUFACTURE OF RESIN ACID ESTERS.
No. 501,446. Patented July 11, 1893.
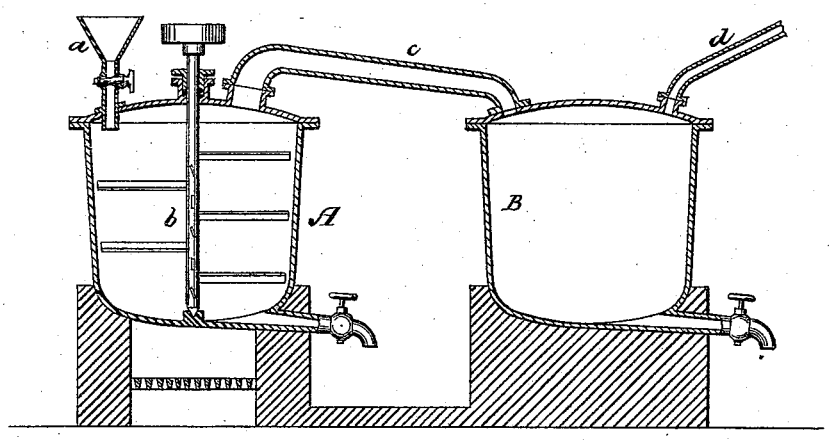
WITNESSES:
INVENTOR:
Eugen Schaal.
BY
Van Santvoord & Hauff
ATTORNEYS.

United States Patent Office.

EUGEN SCHAAL, OF STUTTGART, GERMANY.

MANUFACTURE OF RESIN-ACID ESTERS.

SPECIFICATION forming part of Letters Patent No. 501,446, dated July 11, 1893.

Application filed July 28, 1892. Serial No. 441,514. (No specimens.) Patented in England February 12, 1890, No. 2,308.

*To all whom it may concern:*

Be it known that I, EUGEN SCHAAL, a subject of the King of Würtemberg, residing at Stuttgart, in the Kingdom of Würtemberg and German Empire, have invented new and useful Improvements in the Manufacture of Ester-Like Products, (for which I have obtained a patent in Great Britain, No. 2,308, bearing date February 12, 1890,) of which the following is a specification.

In the manufacture of esterlike products I use acid resins such as copal or animi resins as far as the same are principally soluble in alkalies, and these resins can be mixed with acid resins of conifers such as colophony, or with acid mineral resins or with resin acids such as are obtained by the oxidation of petroleum or of hydrocarbons resulting from the distillation of brown coal, mineral coal, slate and peat and with similar allied resin acids either singly or in mixtures of one or more of these resin acids. Now I have discovered that the formation of the esterlike products by the action of an alcohol or other hydroxyl derivative on such resin acids or their mixtures is materially facilitated, if, while the operation of heating and splitting off of water progresses, the aqueous vapors are drawn off by suction.

The accompanying drawing represents a longitudinal vertical section of an apparatus which can be used with advantage in carrying out my invention.

In the drawing the letter A designates a retort which is provided with a funnel *a* and with a stirrer *b* and which connects by means of a goose neck *c* with a closed vessel B from which extends a pipe *d* which connects with an air pump or other equivalent device (not shown in the drawing) so that a partial vacuum can be maintained in the vessel B. The resin acids or their mixtures are placed into the retort A and heated to 180° to 240° centigrade and when the required temperature has been reached, the alcohols or other hydroxyl derivative or their mixtures are introduced gradually under constant agitation while a vacuum of about ten centimeters is maintained in the vessel B or retort A. The temperature is then gradually raised to about 280° centigrade the agitation being continued, until a test portion taken from the retort A and dissolved in benzine or ether, or ground fine in water, does not give up any soluble portions, when mixed with a solution of sodium carbonate in water (the soda test).

Instead of heating the resin acids in the retort and introducing the alcohol gradually into the same, the operation can be reversed by heating the alcohol in the retort and introducing the resin acids gradually into the same.

The most important alcohols and hydroxyl derivatives for my purpose are the following: glycerine, resorcine, mannite, phenol, cresoles, cane-, grape- and fruit sugars.

The sugars and mannite are usually mixed with equal parts of glycerine, or with different quantities of glycerine, phenol or cresoles and, when phenol or cresoles are used, the addition of twenty-five to fifty per cent. of glycerine and one-half to two per cent. of boric acid is of advantage.

Example: Introduce into the retort fifty pounds manilla copal previously melted, then add fifty pounds of colophony, raise the temperature to about 180° to 210° centigrade, add gradually a mixture of six pounds of fruit sugar with six pounds of glycerine under constant agitation, raise the temperature gradually to 280° centigrade and at the same time, by maintaining a vacuum of about ten centimeters, draw off the aqueous vapors which are produced, as the formation of the resin acid ester progresses. During the process of raising the temperature to 280° centigrade the alcohols which distill off are replaced by the introduction of fresh alcohols, until the formation of the ester is completed which can be ascertained by the soda test above stated.

In place of a mixture of six pounds of fruit sugar with six pounds of glycerine I can use a mixture of sixteen pounds of phenol with four pounds of cane sugar or mannite and four to five pounds of glycerine to which may be added about one-half pound of boric acid.

In order to impart to esterlike products obtained by the foregoing process the greatest possible purity and hardness, I distill the same either with or without a partial vacuum or under a current of indifferent gases as stated in Letters Patent Reissue No. 10,823, dated March 29, 1887, and No. 368,494, dated August 16, 1887, both granted to me. The principal difference between the process which forms the subject matter of this present application and the processes described in the above named patents is: that in the former the aqueous vapors produced during the formation of the esters are removed by the action of a partial vacuum, while in the process described in the above named Reissue No. 10,823 the mixture of resin acid and glycerine is heated under a pressure of several atmospheres and this pressure rises by the formation of water in the form of steam, which is permitted to escape and in the process described in Patent No. 368,499 the mixture of glycerine and colophony, is heated under a pressure of from thirty to fifty pounds to the square inch, until the conversion into ether has been completed.

It is obvious that my new process is applicable only in the formation of esterlike products from alcohol or hydroxyl derivatives which are not volatile or the boiling point of which is above 120° centigrade.

What I claim as new, and desire to secure by Letters Patent, is—

1. The improvement in the art of producing esters or esterlike products, which consists in exposing a resin acid to heat in the presence of an alcohol or hydroxyl derivative in a suitable retort and drawing off the aqueous vapors formed during the formation of the esters or esterlike products by suction applied as soon as the formation of the esters begins, substantially as described.

2. The improvement in the art of producing esters or esterlike products, which consists in exposing a resin acid to heat in the presence of an alcohol or hydroxyl derivative in a suitable retort, drawing off the aqueous vapors formed during the formation of the esters or esterlike products by suction applied as soon as the formation of the esters begins and replacing the alcohols which distill off, by the introduction of a fresh supply, until the formation of the ester or esterlike product is completed, substantially as described.

In testimony whereof I have hereunto set my hand in the presence of two subscribing witnesses.

EUGEN SCHAAL.

Witnesses:
WM. C. HAUFF,
E. F. KASTENHUBER.